(12) United States Patent
Lee et al.

(10) Patent No.: US 8,452,996 B2
(45) Date of Patent: *May 28, 2013

(54) OPERATING MODE FOR EXTREME POWER SAVINGS WHEN NO NETWORK PRESENCE IS DETECTED

(75) Inventors: Jonathan F. Lee, Dublin, CA (US); Gregory Youngblood, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 293 days.

This patent is subject to a terminal disclaimer.

(21) Appl. No.: 12/822,922

(22) Filed: Jun. 24, 2010

(65) Prior Publication Data

US 2010/0262856 A1 Oct. 14, 2010

Related U.S. Application Data

(63) Continuation of application No. 11/269,064, filed on Nov. 8, 2005, now Pat. No. 7,865,748.

(51) Int. Cl.
*G06F 1/00* (2006.01)
*G06F 1/26* (2006.01)
*G06F 1/32* (2006.01)

(52) U.S. Cl.
USPC ............ 713/320; 713/300; 713/323; 719/321

(58) Field of Classification Search
USPC .......................... 713/300, 320, 323; 719/321
See application file for complete search history.

(56) References Cited

U.S. PATENT DOCUMENTS

| | | | |
|---|---|---|---|
| 5,627,412 A | 5/1997 | Beard |
| 5,655,126 A | 8/1997 | Glenning |
| 5,881,300 A | 3/1999 | Chen |
| 6,049,885 A | 4/2000 | Gibson |
| 6,366,957 B1 | 4/2002 | Na |
| 2003/0088796 A1 | 5/2003 | Abdulkarim |
| 2005/0097378 A1 | 5/2005 | Hwang |

*Primary Examiner* — Ji H Bae
(74) *Attorney, Agent, or Firm* — Thomas|Horstemeyer, LLP

(57) ABSTRACT

Drivers which control hardware devices in a network adapter chip are disabled prior to reducing power to a first portion of circuits in the network adapter chip. Power is received by a second portion of circuits which are utilized for detecting network activity and communicating the activity to processors. Upon network activity detection, the first portion of circuits receives power. Drivers are enabled subsequent to detection. Drivers are enabled after receiving power by the first portion of circuits. Processors control hardware devices, disable devices before power reduction, enable devices after network activity detection and enable devices after receiving power. The network adapter chip is reset for power reception. A power reduction mode is selected where drivers are disabled after reducing power. Drivers are enabled after hardware devices are enabled. A first state is characterized by no signal before disabling drivers. A second state is characterized by signal detection before receiving power.

26 Claims, 6 Drawing Sheets

OPERATING MODE FOR EXTREME POWER SAVINGS WHEN NO NETWORK PRESENCE IS DETECTED

CROSS-REFERENCE TO RELATED APPLICATIONS/INCORPORATION BY REFERENCE

This application is a continuation of U.S. application Ser. No. 11/269,064 filed Nov. 8, 2005, which in turn makes reference to U.S. patent application Ser. No. 11/269,419 filed Nov. 8, 2005; and U.S. patent application Ser. No. 11/269,414 filed Nov. 8, 2005

The above stated application is hereby incorporated herein by reference in its entirety.

FIELD OF THE INVENTION

Certain embodiments of the invention relate to integrated circuits or chips. More specifically, certain embodiments of the invention relate to an operating mode for extreme power savings when no network presence is detected.

BACKGROUND OF THE INVENTION

It is desirable to be able to completely power down a device when it is not in use or when it is disabled. For example, a laptop computer may have a wired LAN adapter and a wireless LAN adapter installed. When the laptop computer is moved from one location to another, the wireless LAN adapter may be used, for example, when no wired connection is available, and the wired LAN adapter may not be needed. Accordingly, the wired LAN adapter may be disabled to save battery power on the laptop computer.

However, some chips may have circuitry whose functionality may be required even while the remainder of the chip may be powered down. For example, portions of the wired LAN adapter may need to have power even when the rest of the chip is powered down. These portions may be the circuitry that detects network signals if a network cable is plugged in to the laptop. This may happen if the laptop computer is moved to a location where there may not be a wireless hot spot, and accordingly a cable is plugged in to the laptop computer to access a wired LAN.

Similarly, some interfaces, such as, for example, PCI express (PCIe) serializer/deserializer (SerDes) may communicate status and/or commands with each other over a communication link even when there is no data to be transferred. In this manner, the PCIe SerDes may ensure that the communication link is still active. If a PCIe SerDes, for example, on the wired LAN adapter, is powered down, the PCIe SerDes at the other end of the communication link may assert a system error that its communication link is out of service. Therefore, the usage of additional power while the communication link is active may need to be balanced against the need to keep unwanted system errors from occurring.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for an operating mode for extreme power savings when no network presence is detected, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in an operating mode for extreme power savings when no network presence is detected. Aspects of the method may comprise disabling at least one device driver for at least one hardware device in a network adapter chip. The device driver may be disabled prior to disabling the hardware device upon starting a power reduction mode for the network adapter chip. At least one device driver for at least one hardware device on the network adapter chip may be enabled after enabling the hardware device upon ending a power reduction mode for the network adapter chip. Power may be reduced to the hardware device on the network adapter chip to disable the hardware device. Similarly, power may be provided to the hardware device on the network adapter chip to enable the hardware device. The network adapter chip may be reset to enable the hardware device upon providing power to the hardware device so that the hardware device may be in a known state.

The power reduction mode for the network adapter chip may be selected where the device driver for the hardware device may be disabled before the hardware device may be disabled, and where the device driver for the hardware device may be enabled after the hardware device may be enabled. A first state of an Ethernet network activity, which may be characterized by no Ethernet signal activity being detected, may be determined prior to disabling the device driver for the hardware device. A second state of the Ethernet network activity, which may be characterized by detection of Ethernet signal activity, may be determined prior to enabling the hardware device.

Figure 1:
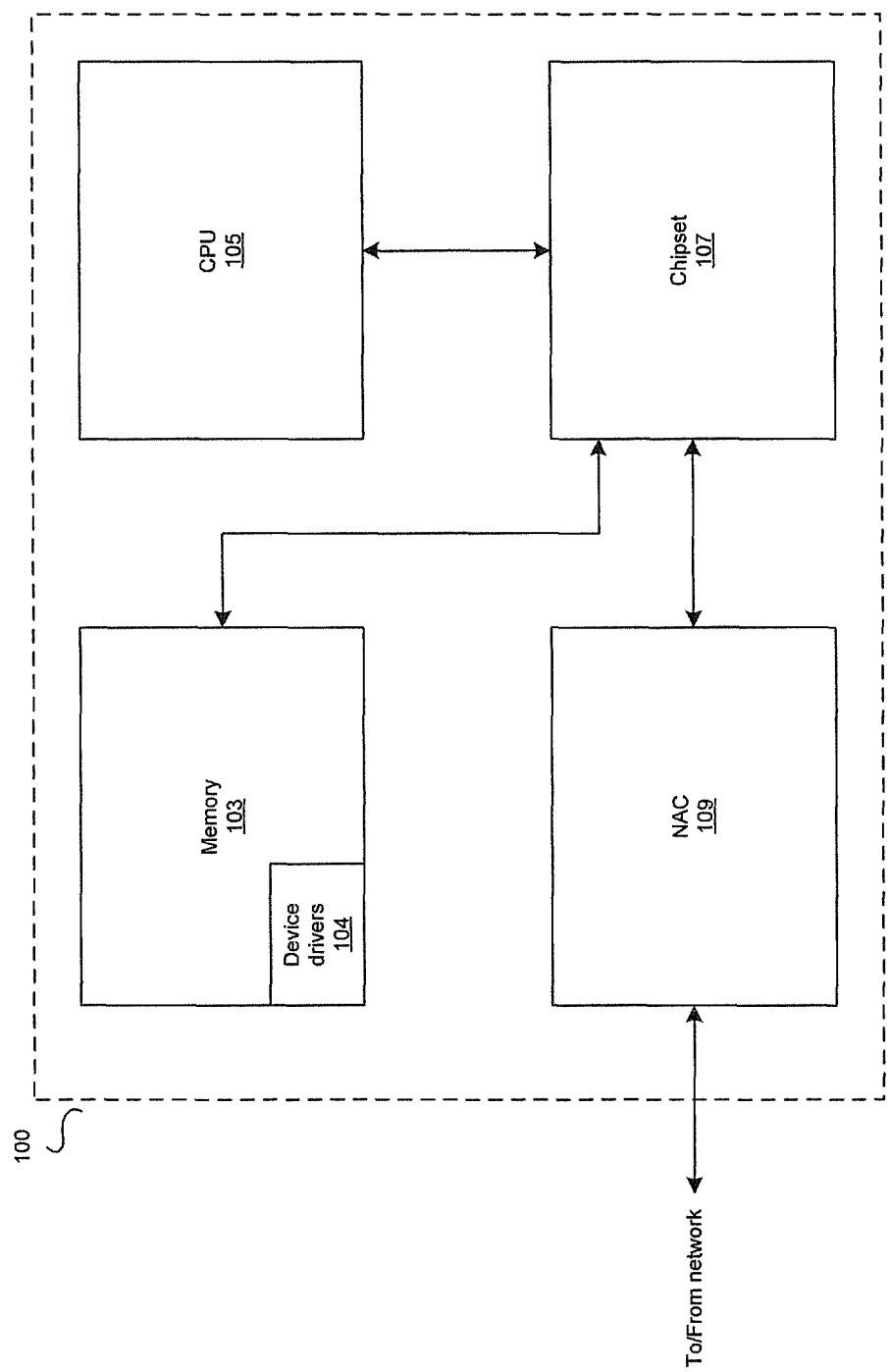
FIG. 1 is a block diagram illustrating an exemplary network adaptor card, which may be utilized in connection with an embodiment of the invention.

FIG. 1 is a block diagram illustrating an exemplary network adaptor card, which may be utilized in connection with an embodiment of the invention. Referring to FIG. 1, there is shown a laptop 100 with a few of the internal components, for example, a memory block 103, a CPU 105, a chipset 107, and a network adaptor chip (NAC) 109. There may be device drivers, for example, a device driver 104 for a PCI express serializer/deserializer (PCIe SerDes), stored on the memory block 103. The PCIe SerDes may be described with respect to FIG. 3. The device drivers 104 may be code and/or data that may allow a level of abstraction in accessing hardware, for example, the NAC 109. The CPU 105 may communicate with the memory block 103 and the chipset 107, and the chipset 107 may communicate with the NAC 109. The NAC 109 may be physically connected to a network, such as, for example, an Ethernet network, via a cable. In this manner, the NAC 109 may transmit data to the network and receive data from the network.

The memory block 103 may comprise suitable logic, circuitry, and/or code that may be adapted to store a plurality of control, status and/or data information. The information stored in memory block 103 may be accessed by other processing blocks, such as, for example, the CPU 105.

The CPU 105 may comprise suitable logic, circuitry, and/or code that may be adapted to process data that may be read from, for example, the memory block 103. The CPU may store data in the memory block 103, and/or communicate data, status, and/or commands with other devices in the laptop, for example, the chipset 107 and/or the NAC 109.

The chipset 107 may comprise suitable logic, circuitry, and/or code that may be adapted to manage input/output data such as voice and/or data traffic from the CPU to the memory block 103 and/or peripheral devices, for example, the NAC 109.

The NAC 109 may comprise suitable logic, circuitry, and/or code that may be adapted to physically interface to the network, for example, the Ethernet network, via a cable. Accordingly, the laptop 100 may send and receive data to and from the Ethernet network.

In operation, the CPU 105 may communicate data to the NAC 109 for transmission to a network destination. Data may be received from a network source, for example, an external computer that may also be on the network, and the NAC 109 may indicate to the CPU 105 the availability of the received data. The CPU 105 may then process the data and/or save the data in the memory block 103.

Figure 2A:
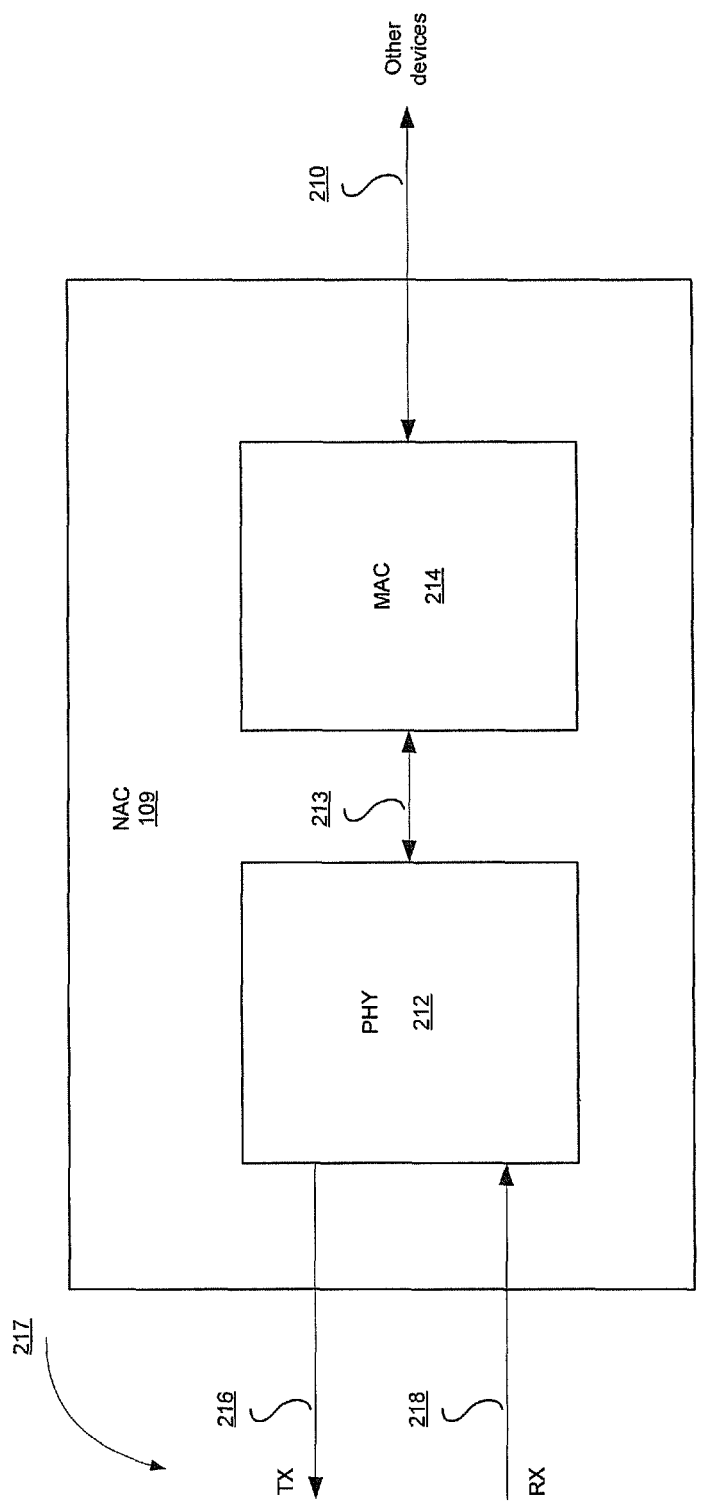
FIG. 2a is a block diagram illustrating an exemplary physical layer device and media access controller, which may be utilized in connection with an embodiment of the invention.

FIG. 2a is a block diagram illustrating an exemplary physical layer device and media access controller, which may be utilized in connection with an embodiment of the invention. Referring to FIG. 2a, there is shown the NAC 109 that may comprise a physical network interface layer (PHY) 212 and a media access controller (MAC) 214.

The PHY 212 may comprise suitable logic, circuitry, and/or code that may be adapted to interface to a network, for example, an Ethernet network. For example, the PHY 212 may be fully compatible with at least IEEE 802.3 standard for auto-negotiation of data transfer speed, where the IEEE 802.3 may be the IEEE standard for Ethernet.

The MAC 214 may comprise suitable logic, circuitry, and/or code that may be adapted to properly format data for packet transmission on, for example, the Ethernet network. The MAC 214 may also be adapted to receive data from the Ethernet network and to remove the Ethernet network related frame information so that higher level protocols may extract desired information from the received frame.

In operation, the PHY 212 may communicate data to the Ethernet network via a transmit and receive interface 217. The transmit and receive interface 217 may comprise a serial transmit interface 216 and a serial receive interface 218. The PHY 212 may receive Ethernet network data via the serial receive interface 218, and transmit data to the Ethernet network via the serial transmit interface 216. The PHY 212 may sense collision when transmitting data and may comply with the Carrier Sense Multiple Access/Collision Detect (CSMA/CD) access method defined in IEEE 802.3

The MAC 214 may receive data from, for example, the CPU 105 (FIG. 1), and form appropriate frames for the Ethernet network, for example. The MAC 214 may communicate the frames to the PHY 212 via the interface 213 between the PHY 212 and the MAC 214. Additionally, the MAC 214 may receive data from the network via the PHY 212. The MAC 214 may remove the network related information, for example, the Ethernet protocol information, and may communicate the remaining data to, for example, the CPU 105 via, for example, a general purpose I/O (GPIO) bus 210. The CPU 105 may process the received frame to retrieve data that may have been sent by another application on the network. The GPIO bus 210 may be a general bus interface defining various pins, which may be configurable, for input and/or output usage, or an interface that uses the GPIO standard. The particular definition of pin-outs for bus signals may be design and/or implementation dependent.

Figure 2B:
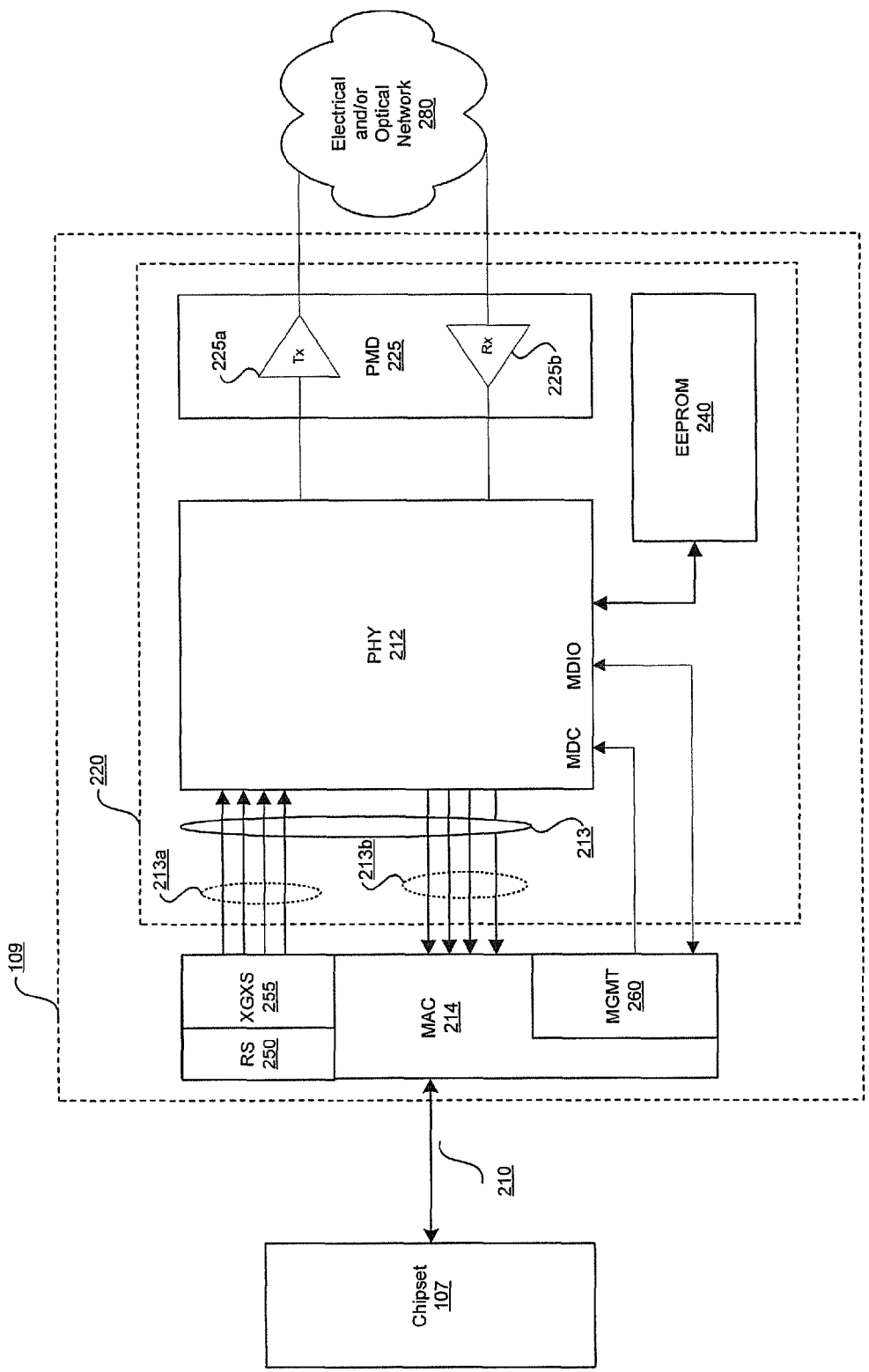
FIG. 2b is a block diagram of an exemplary Ethernet transceiver module and a media access controller, in accordance with an embodiment of the invention.

FIG. 2b is a block diagram of an exemplary Ethernet transceiver module and a media access controller, in accordance with an embodiment of the invention. Referring to FIG. 2b, there is illustrated a chipset 107, a network adaptor chip (NAC) 109, and a network 280. The NAC 109 may comprise the MAC 214 and a transceiver module 220. The transceiver module 220 may comprise the PHY 212, an electrically erasable programmable read only memory (EEPROM) 240, and a physical medium dependent (PMD) transceiver 225. The PMD transceiver 225 may comprise a PMD transmitter 225a and a PMD receiver 225b. The chipset 107 may interface with the MAC 214 through the GPIO bus 210 and may communicate with the network 280 through the transceiver module 220. The network 280 may be an electrical and/or optical network. The PMD transmitter 225a and a PMD receiver 225b may not be needed in cases when the network 280 is an electrical network.

Transceiver module 220 may be configured to communicate data between the chipset 107 and the network 280. The data transmitted and/or received may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, a layer 1 may provide services to a layer 2 and the layer 2 may provide services to a layer 3. A data link layer, the layer 2, may include a MAC layer whose functionality may be handled by the MAC 214. In this regard, the MAC 214 may be configured to implement the well-known IEEE 802.3 Ethernet protocol.

In an embodiment of the invention, the MAC 214 may represent the layer 2 and the transceiver module 220 may represent the layer 1. The layer 3 and above may be represented by a CPU, for example, the CPU 105 (FIG. 1), which may be accessed from the NAC 109 via the chipset 107. The CPU 105 may be configured to build five highest functional layers for data packets that are to be transmitted over the network 280. Since each layer in the OSI model may provide a service to the immediately higher interfacing layer, the MAC 214 may provide the necessary services to the CPU 105 to ensure that packets are suitably formatted and communicated to the transceiver module 220. During transmission, each layer may add its own header to the data passed on from the interfacing layer above it. However, during reception, a compatible device having a similar OSI stack may strip off the headers as the message passes from the lower layers up to the higher layers.

The transceiver module 220 may be configured to handle all the physical layer requirements, which may include, but is not limited to, packetization, data transfer and serialization/deserialization (SerDes). The transceiver module 220 may operate at a plurality of data rates, which may include 10 Mbps, 100 Mbps and 1 Gbps, for example. Data packets received by the transceiver module 220 from the MAC 214 may include data and header information for each of the above six functional layers. The transceiver module 220 may be configured to encode data packets that are to be transmitted over the network 280. The transceiver module 220 may also be configured to decode data packets received from the network 280.

The MAC 214 may interface with the PHY 212 through, for example, the interface 213. The interface 213 may be a low pin count, self-clocked bus. The interface 213 may act as an extender interface for a media independent interface (XMGII). In this regard, MAC 214 may also include a reconciliation sublayer (RS) interface 250 and an XGMII extender sublayer (XGXS) interface 255. The MAC 214 may also include an integrated link management (MGMT) interface 260 that may facilitate communication between the MAC 214 and a management data input/output (MDIO) interface of the PHY 212.

The PMD transceiver 225 may include at least one PMD transmitter 225a and at least one PMD receiver 225b. In operation, PMD transceiver 225 may be configured to receive data from and transmit data to the network 280. The PMD transmitter 225a may transmit data originating from the CPU 105. The PMD receiver 225b may receive data destined for the CPU 105 from the network 280 and transmit the data to the CPU 105 via the chipset 107. The PMD 225 may also be configured to function as an electro-optical interface. In this regard, electrical signals may be received by PMD transmitter 225a and transmitted in a format such as optical signals over the network 280. Additionally, optical signals may be received by PMD receiver 225b and transmitted as electrical signals to the chipset 107.

The transceiver module 220 may also include an EEPROM 240. The PHY 212 may be coupled to the EEPROM 240 through an interface such as a serial interface or bus. The EEPROM 240 may be programmed with information such as, for example, parameters and/or code that may effectuate the operation of the PHY 212. The parameters may include configuration data and the code may include operational code such as software and/or firmware, but the information is not limited in this regard.

Figure 3:
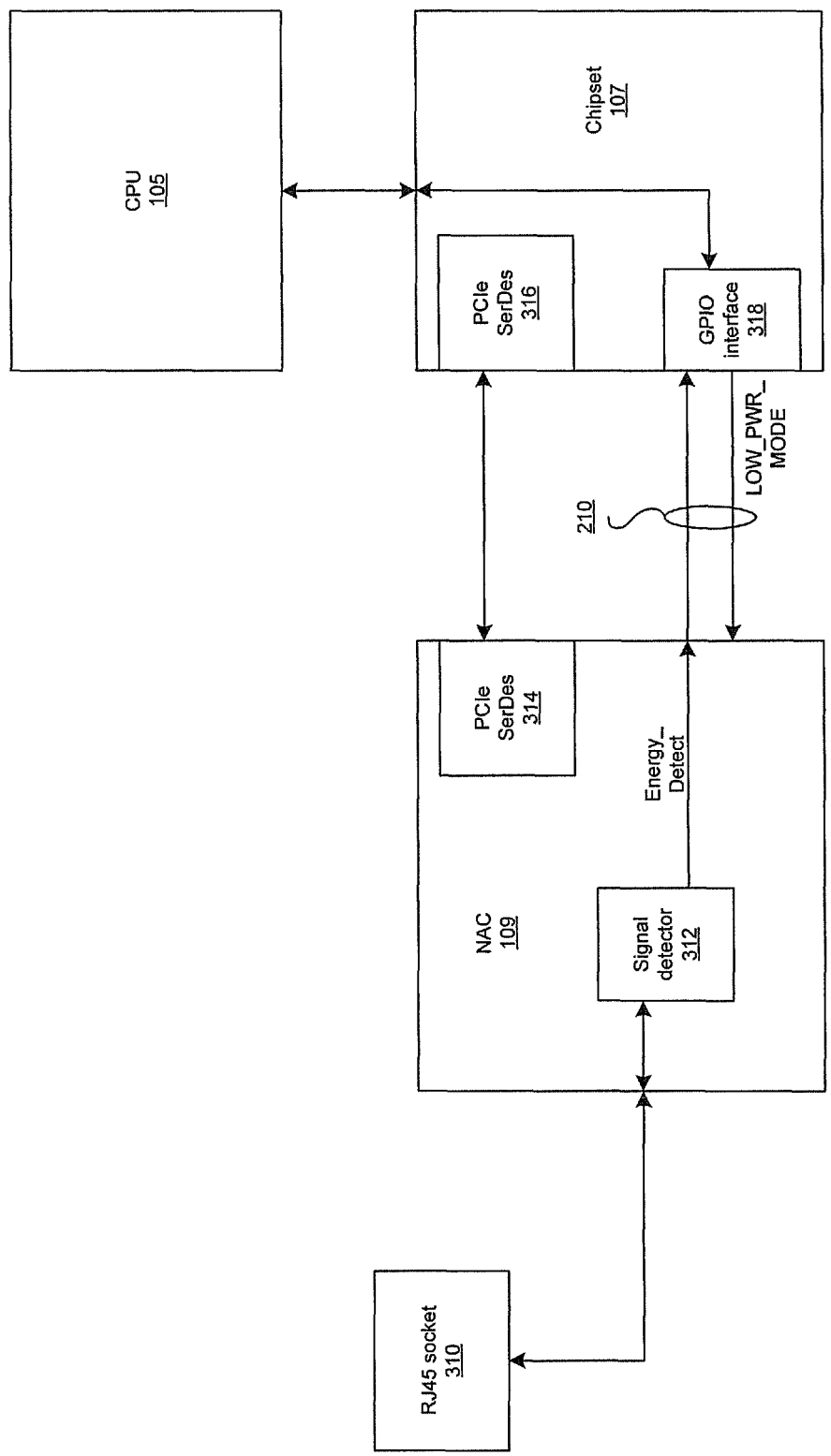
FIG. 3 is a block diagram illustrating an exemplary communication path between a chipset and a network adaptor chip for power reduction mode, in accordance with an embodiment of the invention.

FIG. 3 is a block diagram illustrating an exemplary communication path between a chipset and a network adaptor chip for power reduction mode, in accordance with an embodiment of the invention. Referring to FIG. 3, there is shown the CPU 105, the chipset 107, the NAC 109, and a RJ-45 socket 310. The NAC 109 may comprise a signal detector 312 and a PCI express serializer/deserializer (PCIe SerDes) 314. The chipset 107 may comprise a PCIe SerDes 316 and a GPIO interface 318.

The RJ-45 socket 310 may accept network cables, for example, Ethernet cables, which may be terminated by RJ-45 plugs. The signal detector 312 may comprise suitable logic, circuitry, and/or code that may be adapted to detect network activity, for example, Ethernet signal activity, which may be communicated to the signal detector 312 from the RJ-45 socket. If network activity is detected, the signal detector 312 may assert a network activity detected signal Energy_Detect. If the signal detector 312 does not detect network activity, it may de-assert the network activity detected signal Energy_Detect.

The PCIe SerDes 314 and 316 may comprise suitable logic, circuitry, and/or code that may be adapted to receive parallel data and serialize it for transmission over a serial line, or receive serial data and convert it to parallel data. The GPIO interface 318 may transmit and receive signals on the GPIO bus 210.

In operation, voltage level from the Ethernet network may be communicated to the signal detector 312. If the signal detector 312 determines when the communicated voltage level comprises network activity, the signal detector 312 may assert the network activity detected signal Energy_Detect. The network activity detected signal Energy_Detect may be communicated to the chipset 107. The chipset 107 may communicate this signal to the CPU 105, and the CPU 105 may take appropriate action. For example, the CPU 105 may take steps to ensure that the NAC 109 stays powered up, or to power up the NAC 109 if the NAC 109 is in a powered down state. Powered down state may also be referred to as a reduced power state.

If the signal detector 312 does not detect signals on the network, the network activity detected signal Energy_Detect may be de-asserted. As a result, the CPU 105 may power down the NAC 109. For example, the CPU 105 may cause the power down signal LOW_PWR_MODE from the chipset 107 to the NAC 109 to be asserted. Upon reception of the asserted power down signal LOW_PWR_MODE, the NAC 109 may power down by reducing voltage to at least some of the circuitry in the NAC 109. Some circuitry in the NAC 109 may not be powered down completely. For example, the signal detector 312 may not be powered down in order to be able to monitor signal activity on the network. In this manner, when the signal detector 312 detects signals on the network, the signal detector 312 may notify the CPU 105 that there is signal activity on the network. The CPU 105 may then take steps to have the NAC 109 power up in order to be able to receive network data and to be able to transmit data to the network.

Additionally, a device driver, for example, the device driver 104 (FIG. 1), for the PCIe SerDes 314 may need to be disabled before the PCIe SerDes 314 is powered down. Device drivers may be software and/or firmware code that may allow a level of abstraction in accessing hardware. The device drivers 104 may be stored in memory, for example, the memory block 103 (FIG. 1). The device driver, for example, the device driver 104 for the PCIe SerDes 314, may be enabled or disabled. If enabled, the device driver may allow access to the PCIe SerDes 314. If disabled, communication to the PCIe SerDes 314 may not be allowed.

A PCIe communication link between, for example, the PCIe SerDes 314 and the PCIe SerDes 316, may be utilized to communicate frames even if there is no application data to transmit from one PCIe SerDes to the other. Application data may be, for example, data that may be transmitted to the network or data that may have been received from the network. The communication of frames between the PCIe SerDes 314 and PCIe SerDes 316 may keep each PCIe SerDes up-to-date on the other PCIe SerDes' status. Accordingly, if the PCIe SerDes 314 is powered down before the device driver 104 for the PCIe SerDes 314 is disabled, the PCIe SerDes 316 may transmit to the PCIe SerDes 314 and expect replies from the PCIe SerDes 314. Because no reply may be received from the PCIe SerDes 314 that may be powered down, a system error may occur. However, if the device driver 104 for the PCIe SerDes 314 is disabled prior to powering down the PCIe SerDes 314, the PCIe SerDes 316 may not attempt to communicate with the PCIe SerDes 316 until the device driver 104 for the PCIe SerDes 314 is enabled, by the CPU 105, for example.

The signal detector 312 may detect signals on the Ethernet network while the NAC 109 is powered down. Accordingly, this information may be communicated to the chipset 107, and hence to the CPU 105, by asserting the network activity detected signal Energy_Detect. The CPU 105 may issue commands that may result in the power down signal LOW_PWR_MODE signal being de-asserted. In response to the de-assertion of the power down signal LOW_PWR_MODE, the NAC 109 may do a power-up reset in order to bring the NAC 109 to a known active state. The network activity detected signal Energy_Detect may be asserted during the NAC 109 power-up reset, and the device driver 104 for the PCIe SerDes 314 may be fully enabled.

Figure 4:
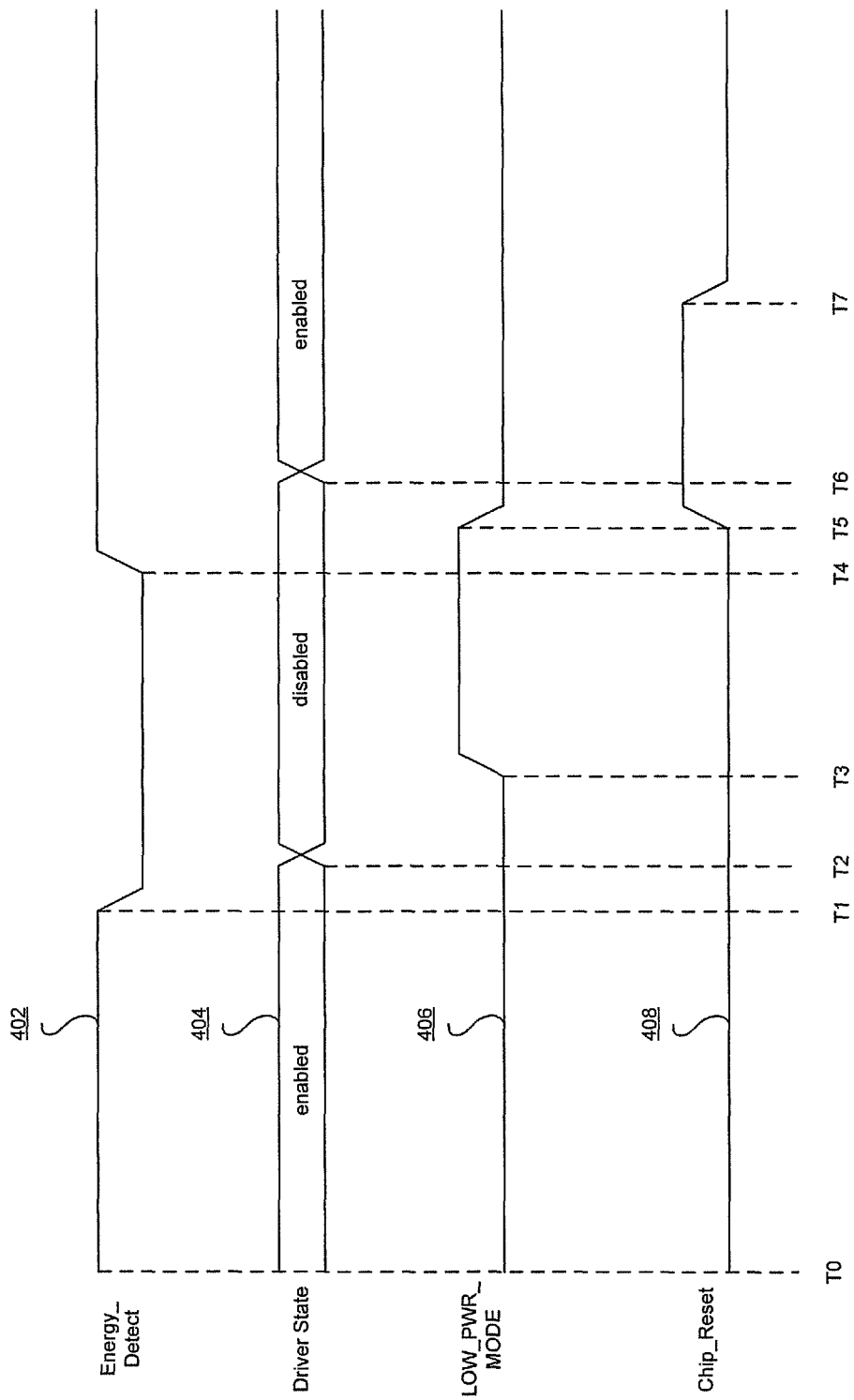
FIG. 4 is a timing diagram illustrating an exemplary timing of power down and power up sequences, in accordance with an embodiment of the invention.

FIG. 4 is a timing diagram illustrating an exemplary timing of power down and power up sequences, in accordance with an embodiment of the invention. Referring to FIG. 4, there is shown the network activity detected signal Energy_Detect 402, the driver state signal 404, the power down signal LOW_PWR_MODE 406, and the Chip_Reset signal 408.

At time instant T0, the network cable may be plugged in to the RJ-45 socket 310 (FIG. 3) and therefore, the signal detector 312 may detect network activity. Accordingly, the network activity detected signal Energy_Detect 402 may be asserted. Since the network activity detected signal Energy_Detect 402 may be asserted, the device driver 104 for the PCIe SerDes 314 may be enabled and this may be reflected by the driver state signal 404. Additionally, since the network activity detected signal Energy_Detect 402 may be asserted the power down signal LOW_PWR_MODE 406 may be unasserted. Therefore, a chip, for example, the NAC 109, may remain fully powered, and the Chip_Reset signal 408 may be de-asserted.

At time instant T1, the signal detector 312 may de-assert the network activity detected signal Energy_Detect 402 because it may not have detected any network activity. One reason for this may be because the network cable may have been removed from the RJ-45 socket 310. The network activity detected signal Energy_Detect 402 may be communicated to, for example, the chipset 107, which may communicate the network activity status to the CPU 105. The CPU 105 may disable the device driver 104 for the PCIe SerDes 314 at time instant T2. At time instant T3, when the device driver 104 for the PCIe SerDes 314 may be disabled, the CPU 105 may execute steps that may cause the power down signal LOW_PWR_MODE 406 to be asserted. Accordingly, portions of the NAC 109, including the PCIe SerDes 314, but not the signal detector 312, may be powered down. Powering down may comprise disabling or turning off power to circuitry and/or stopping clock signals that may be used by the circuitry, and/or disabling the circuitry.

At time instant T4, the signal detector 312 may detect signal activity on the network, for example, because the network cable may have been connected to the RJ-45 socket 310. Accordingly, the signal detector 312 may assert the network activity detected signal Energy_Detect 402. The power down signal LOW_PWR_MODE 406 may then be de-asserted at time instant T5. The NAC 109 may respond to the de-assertion of the power down signal LOW_PWR_MODE 406 by performing a power-up reset in order to bring the NAC 109 to a known working state. Therefore, the Chip_Reset signal 408 may be asserted at time instant T5. At time instant T6, the CPU 105 may enable the device driver 104 for the PCIe SerDes 314. At time instant T7, the Chip_Reset signal 408 may be de-asserted and the NAC 109 may be fully powered up and in a known working state.

Figure 5:
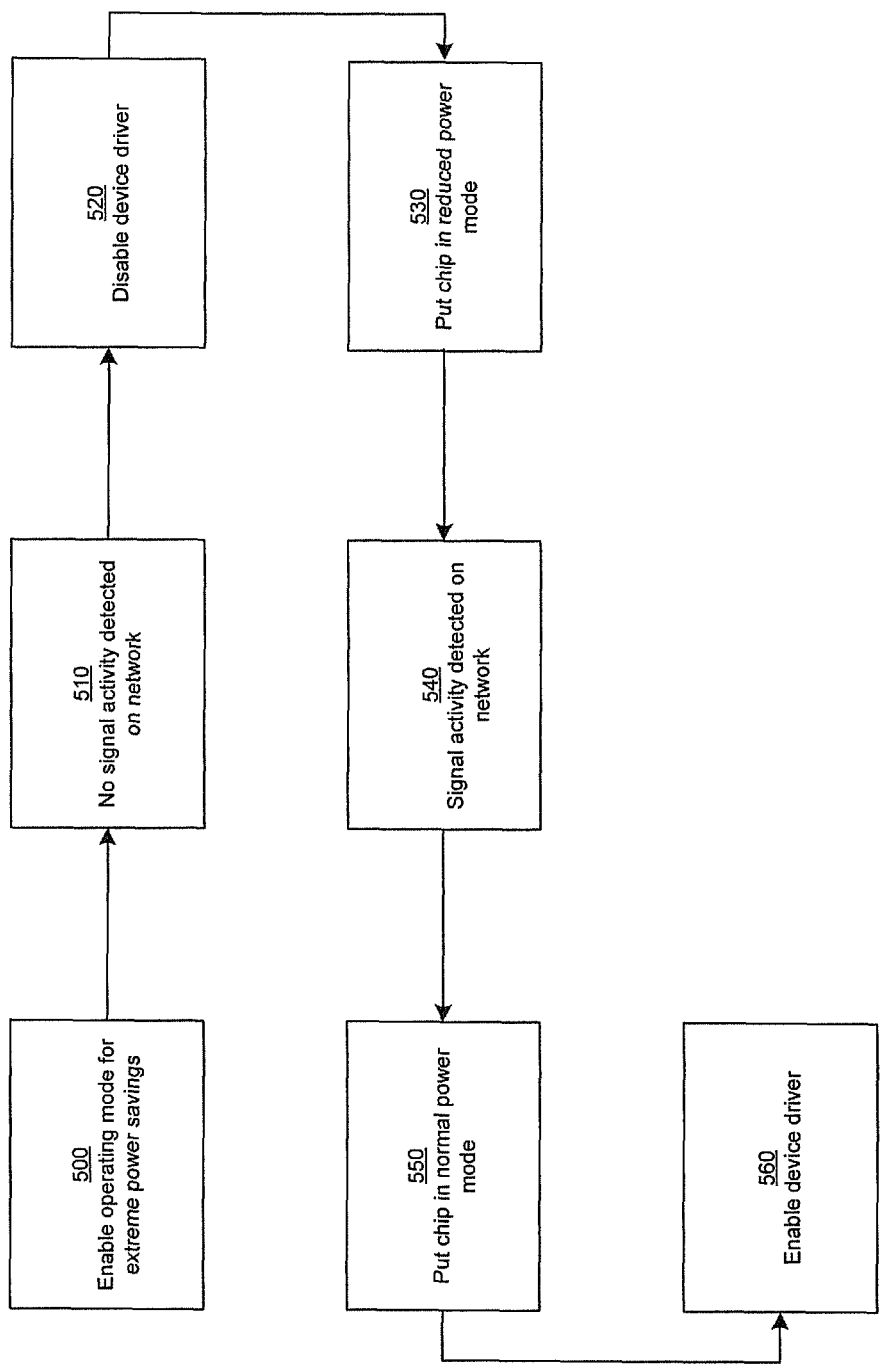
FIG. 5 is a flow diagram illustrating an exemplary routine for powering down and powering up circuitry, in accordance with an embodiment of the invention.

FIG. 5 is a flow diagram illustrating an exemplary routine for powering down and powering up circuitry, in accordance with an embodiment of the invention. Step 500 may comprise enabling the operating mode for extreme power savings. Step 510 may comprise a state when no signal activity is detected on a network. Step 520 may comprise disabling a device driver. Step 530 may comprise putting a chip in reduced power mode. Step 540 may comprise detecting signal activity on the network. Step 550 may comprise putting the chip in normal power mode. Step 560 may comprise enabling the device driver.

Referring to FIG. 5, and with respect to FIGS. 3 and 4, there is shown a plurality of steps 500 to 560 that may be utilized to power down a chip, for example, the NAC 109 (FIG. 3). In step 500, the operating mode for extreme power savings, which may be a mode of power reduction in circuitry, may be enabled. This mode may be used to disable circuitry on a chip or circuit block, for example, the NAC 109, that may not be needed at the present time, thereby reducing power consumption. For example, circuitry on the NAC 109 that may be disabled may be the PCIe SerDes 314 that may be used to communicate to the PCIe SerDes 316 on the chipset 107.

Since the PCIe SerDes 314 and 316 at either end of the communication link between the chipset 107 and the NAC 109 may send status and/or commands to each other, disabling the PCIe SerDes 314 without taking proper precautions may result in a system error. One precaution may comprise disabling the device driver 104 for the PCIe SerDes 314 before removing power from the PCIe SerDes 314. In instances where the device driver 104 for the PCIe SerDes 314 is disabled, the PCIe SerDes 316 may not attempt to communicate to the PCIe SerDes 314. If the operating mode for extreme power savings is not enabled, then an alternate power reduction mode may be used. The alternate power reduction mode may disable circuitry, except those related to signal detection, such as for example, the signal detector 312. This power reduction mode may be used when, for example, the PCIe SerDes is not used.

In step 510, the signal detector 312 may monitor network activity. When the signal detector 312 fails to detect network activity, it may de-assert the network activity detected signal Energy_Detect 402, for example, at time instant T1. This signal may be communicated to the chipset 107, and the chipset 107 may communicate the lack of network activity to the CPU 105.

In step 520, the CPU 105 may respond to the de-asserted network activity detected signal Energy_Detect 402 by disabling the device driver 104 for the PCIe SerDes 314 on the NAC 109, for example, at time instant T2. This may prevent the PCIe SerDes 316 from asserting a system error when the PCIe SerDes 314 is powered down.

In step 530, the CPU 105 may indicate that the power down signal LOW_PWR_MODE may be asserted to the NAC 109. For example, the power down signal LOW_PWR_MODE may be asserted, for example, at time instant T3. The NAC 109 may supply power to the signal detector 312 to keep it, and other circuitry that may be needed for detecting and communicating the detected network activity, for example, to the chipset 107 and the CPU 105, while powering down the rest of the NAC 109. Some circuitry that may need to remain powered up may be the interface circuitry for the signals communicated to/from the RJ-45 connector 310 and some interfaces to the chipset 107. For example, an interface to the chipset 107 may be the PCIe SerDes 314. Additional circuitry that may need to be powered up may be power control and/or reset circuitry. The specific method of determining circuitry that may have power reduced, for example, in the NAC 109, may be design and/or implementation dependent.

In step 540, while the NAC 109 may be in power reduction mode, the signal detector 312 may detect network activity, for example, Ethernet network activity. The signal detector 312 may then assert the network activity detected signal Energy_Detect 402, for example, at time instant T4. The detection of network activity may be communicated to the CPU 105. In response, the CPU 105 may take steps that may result in de-assertion of the power down signal LOW_PWR_MODE, for example, at time instant T5.

In step 550, the de-assertion of the power down signal LOW_PWR_MODE may cause power to be restored to all circuitry in the NAC 109, and there may also be a power-up reset of the NAC 109, for example, at time instant T5. After the power-up reset finishes, for example, at time instant T7, the circuitry in the NAC 109 may be powered up to a known state.

In step 560, the CPU 105 may enable the device driver 104 for the PCIe SerDes 314 at time T6. When this device driver 104 is enabled, the communication link between the PCIe SerDes 314 and 316 may be established and data may be transferred from the chipset 107 to the NAC 109, and vice versa. Accordingly, data may be transmitted to the network and data may be received from the network.

Aspects of the system may comprise circuitry, for example, the PCIe SerDes 314 (FIG. 3), in a network adapter chip (NAC) 109 where at least one device driver, for example, in the device drivers 104 (FIG. 1), for the circuitry may be disabled prior to disabling the PCIe SerDes 314 upon initiating a power reduction mode for the NAC 109. At least one device driver for the circuitry may be enabled after enabling the circuitry upon ending a power reduction mode for the NAC 109. Power may be reduced to the circuitry in the NAC 109 to disable the circuitry. Power may be supplied to the circuitry in the NAC 109 to enable the circuitry, and resetting the circuitry may be part of enabling of the circuitry.

There may be circuitry, for example, the CPU 105, which may select a power reduction mode for the NAG 109 where the device driver for the circuitry may be disabled before the circuitry in the NAC 109 is disabled. The power reduction mode selected may enable the device driver for the circuitry in the NAC 109 after the circuitry in the NAC 109 is enabled. Additionally, a first state of an Ethernet network activity may be determined prior to disabling the device driver for the circuitry in the NAC 109. The first state of the Ethernet network activity may be characterized by no Ethernet signal activity being detected. The second state of the Ethernet network activity may be determined prior to enabling the hardware device. The second state of the Ethernet network activity may be characterized by detection of Ethernet signal activity.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
reducing power to a first portion of a network adapter chip, wherein one or more drivers that controls one or more hardware devices in said network adapter chip are disabled prior to said reduction of said power;
receiving power by a second portion of said network adapter chip, wherein said second portion of said network adapter chip is utilized for detecting network activity and for communicating said detected network activity to one or more processors that are directly coupled to said network adapter chip; and
receiving power by said first portion of said network adapter chip when said detection results in detection of said network activity, wherein said one or more drivers that controls said one or more hardware devices in said network adapter chip are enabled subsequent to said detection of said network activity.

2. The method according to claim 1, wherein said one or more drivers that controls said one or more hardware devices in said network adapter chip are enabled subsequent to said receiving of said power by said first portion of said network adapter chip.

3. The method according to claim 1, wherein said one or more processors controls said one or more hardware devices in said network adapter chip.

4. The method according to claim 1, wherein said one or more processors disables said one or more hardware devices in said network adapter chip prior to said reduction of said power.

5. The method according to claim 1, wherein said one or more processors enables said one or more hardware devices in said network adapter chip subsequent to said detection of said network activity.

6. The method according to claim 1, wherein said one or more processors enables said one or more hardware devices in said network adapter chip subsequent to said receiving of said power by said first portion of said network adapted chip.

7. The method according to claim 1, comprising resetting said network adapter chip to receive said power by said first portion of said network adapter chip and by said second portion of said network adapter chip subsequent to said detection of said network activity.

8. The method according to claim 1, comprising selecting a power reduction mode, which corresponds to said reduction of said power, for said network adapter chip, wherein said one or more drivers that controls said one or more hardware devices is disabled before said one or more hardware devices is disabled.

9. The method according to claim 1, comprising enabling one or more drivers that controls said one or more hardware devices after said one or more hardware devices are enabled.

10. The method according to claim 1, comprising determining a first state of an Ethernet network activity prior to said disabling of said one or more drivers that controls said one or more hardware devices.

11. The method according to claim 10, wherein said first state of said Ethernet network activity is characterized by no Ethernet signal activity being detected.

12. The method according to claim 1, comprising determining a second state of an Ethernet network activity prior to receiving power by said first portion of said network adapter chip.

13. The method according to claim 12, wherein said second state of said Ethernet network activity is characterized by detection of Ethernet signal activity.

14. A system, comprising:
one or more processors, one or more circuits, or any combination thereof, for use in a network adapter chip, wherein said one or processors and/or circuits are operable to:
reduce power to a first portion of said network adapter chip, wherein one or more drivers that controls one or more hardware devices in said network adapter chip are disabled prior to said reduction of said power;
receive power by a second portion of said network adapter chip, wherein said second portion of said network adapter chip is utilized for detecting network activity and for communicating said detected network activity to one or more processors that are directly coupled to said network adapter chip; and
receive power by said first portion of said network adapter chip when said detection results in detection of said network activity, wherein said one or more drivers that controls said one or more hardware devices in said network adapter chip are enabled subsequent to said detection of said network activity.

15. The system according to claim 14, wherein said one or more drivers that controls said one or more hardware devices in said network adapter chip are enabled subsequent to said receiving of said power by said first portion of said network adapter chip.

16. The system according to claim 14, wherein said one or more processors that are directly coupled to said network adapter chip, controls said one or more hardware devices in said network adapter chip.

17. The system according to claim 14, wherein said one or more processors that are directly coupled to said network adapter chip disables said one or more hardware devices in said network adapter chip prior to said reduction of said power.

18. The system according to claim 14, wherein said one or more processors that are directly coupled to said network adapter chip enables said one or more hardware devices in said network adapter chip subsequent to said detection of said network activity.

19. The system according to claim 14, wherein said one or more processors that are directly coupled to said network adapter chip enables said one or more hardware devices in said network adapter chip subsequent to said receiving of said power by said first portion of said network adapted chip.

20. The system according to claim 14, wherein said one or more processors, said one or more circuits, or any combination thereof, are operable to reset said network adapter chip to receive said power by said first portion of said network adapter chip and by said second portion of said network adapter chip subsequent to said detection of said network activity.

21. The system according to claim 14, wherein said one or more processors, said one or more circuits, or any combination thereof, are operable to select a power reduction mode, which corresponds to said reduction of said power, for said network adapter chip, wherein said one or more drivers that controls said one or more hardware devices is disabled before said one or more hardware devices is disabled.

22. The system according to claim 14, wherein said one or more processors, said one or more circuits, or any combination thereof, are operable to enable said one or more drivers that controls said one or more hardware devices after said one or more hardware devices are enabled.

23. The system according to claim 14, wherein said one or more processors, said one or more circuits, or any combination thereof, are operable to determine a first state of an Ethernet network activity prior to said disabling of said one or more drivers that controls said one or more hardware devices.

24. The system according to claim 23, wherein said first state of said Ethernet network activity is characterized by no Ethernet signal activity being detected.

25. The system according to claim 14, wherein said one or more processors, said one or more circuits, or any combination thereof, are operable to determine a second state of an Ethernet network activity prior to receiving power by said first portion of said network adapter chip.

26. The system according to claim 25, wherein said second state of said Ethernet network activity is characterized by detection of Ethernet signal activity.

* * * * *